United States Patent [19]
De La Huerga

[11] Patent Number: 6,044,134
[45] Date of Patent: Mar. 28, 2000

[54] MESSAGING SYSTEM AND METHOD

[76] Inventor: Carlos De La Huerga, 9190 N. Upper River Rd., River Hills, Wis. 53217

[21] Appl. No.: 08/936,939

[22] Filed: Sep. 23, 1997

[51] Int. Cl.[7] .................................................. H04M 1/64
[52] U.S. Cl. .................................. 379/88.08; 379/88.11; 379/88.26; 379/92.01
[58] Field of Search ........................... 379/88.08, 88.09, 379/88.11, 88.23, 88.24, 88.25, 88.26, 88.27, 92.01, 92.02, 92.03, 92.04

[56] References Cited

U.S. PATENT DOCUMENTS

| | | | |
|---|---|---|---|
| 4,602,129 | 7/1986 | Matthews et al. | 179/18 B |
| 4,792,968 | 12/1988 | Katz | 379/92 |
| 4,845,739 | 7/1989 | Katz | 379/92 |
| 5,179,585 | 1/1993 | Macmillan, Jr. et al. | 379/92 |
| 5,187,735 | 2/1993 | Garcai et al. | 379/88 |
| 5,255,309 | 10/1993 | Katz | 379/88 |
| 5,259,023 | 11/1993 | Katz | 379/88 |
| 5,416,830 | 5/1995 | MacMillan, Jr. et al. | 379/88 |
| 5,528,670 | 6/1996 | Elliot et al. | 379/88 |
| 5,546,452 | 8/1996 | Andrews et al. | 379/219 |
| 5,561,707 | 10/1996 | Katz | 379/88 |
| 5,838,774 | 11/1998 | Weisser, Jr. | 379/92.02 |
| 5,878,214 | 3/1999 | Gilliam et al. | 379/88.11 |
| 5,893,098 | 4/1999 | Peters et al. | 77/10 |

*Primary Examiner*—Fan S. Tsang
*Attorney, Agent, or Firm*—Quarles & Brady. LLP

[57] ABSTRACT

A method and apparatus used with an automatic voice messaging system to allow at least one user to formulate a plurality of questions to be posed to system users requiring specific response types, as questions are posed, a response table for subsequently received responses automatically generated. When responses are received and the question initiator accesses the system, the responses are automatically displayed on a screen in the response table for easy viewing. The response table can also be manually manipulated to add additional information or modify presentation.

61 Claims, 8 Drawing Sheets

234 {
```
"The next meeting of the sales managers will be Sept. 14th. Can you
attend?" *1      ← 240

"The forcasts are now due. Pease enter your forcast for the next year." *2   ← 242

"Please enter the name of the sales person who has improved the most in
the past year." *3   ← 244

"Thank you for your prompt attention and responses to this voice mail."
```

Figure 5

270 {
```
"The next meeting of the sales managers will be Sept. 14th. Can you attend?"
                    "Please enter a 1 for Yes or a 0 for No     ← 274
                     or press the star key"

"The forcasts are now due. Pease enter your forcast for the next year."
                    "Please enter a number followed by the star key"   ← 278

"Please enter the name of the sales person who has improved the most in the
past year."
                    "Please respond, press the star key when done"   ← 282

"Thank you for your prompt attention and responses to this voice mail."
```

Figure 6

| Extension | Response | Question 1 | Question 2 | Question 3 |
|---|---|---|---|---|
| 5574 | NO | | | |
| 3263 | NO | | | |
| 1093 | NO | | | |
| 5322 | NO | | | |
| 5489 | NO | | | |
| 4561 | NO | | | |
| 4487 | NO | | | |
| 4184 | NO | | | |
| 3473 | NO | | | |

Figure 7

Paul E. Henrdicks  National Sales Manager
Outgoing Mesages

| Message to: Extension  Name | Date/Time | Response Requested |
|---|---|---|
| 3121    John Marks | 12-Sep-97  11:12 | NO |
| 3187    Sam Fullerton | 12-Sep-97  10:43 | YES |
| ---- Group Message ---- | 12:Sep-97   9:05 | YES |

Figure 8

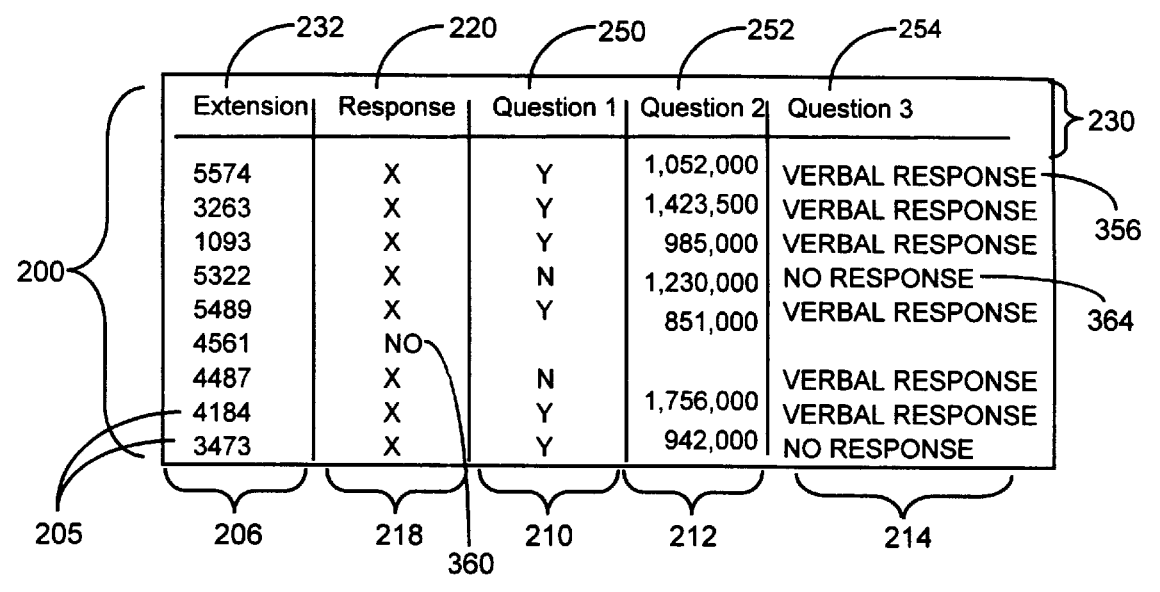

| Extension | Response | Question 1 | Question 2 | Question 3 |
|---|---|---|---|---|
| 5574 | X | Y | 1,052,000 | VERBAL RESPONSE |
| 3263 | X | Y | 1,423,500 | VERBAL RESPONSE |
| 1093 | X | Y | 985,000 | VERBAL RESPONSE |
| 5322 | X | N | 1,230,000 | NO RESPONSE |
| 5489 | X | Y | 851,000 | VERBAL RESPONSE |
| 4561 | NO | | | |
| 4487 | X | N | | VERBAL RESPONSE |
| 4184 | X | Y | 1,756,000 | VERBAL RESPONSE |
| 3473 | X | Y | 942,000 | NO RESPONSE |

Figure 9

| Name | Sales Area | Response | Can you attend Sales Meeting? | Forecast for Next Year | Current Year Forecast | Most Improved Salesperson |
|---|---|---|---|---|---|---|
| Wilson | Northeast Region | X | Y | $1,052,000 | $1192000 | VERBAL RESPONSE |
| Baker | East Coast Region | X | Y | $1,423,500 | $1132500 | VERBAL RESPONSE |
| Helprin | Southeast Region | X | Y | $985,000 | $921000 | VERBAL RESPONSE |
| Adamson | Florida Region | X | N | $1,230,000 | $1495500 | NO RESPONSE |
| Meyers | North Central Region | X | Y | $851,000 | $720000 | VERBAL RESPONSE |
| Foster | Midwest Region | NO | | | | |
| Martinez | Texas Region | X | N | $1,756,000 | $1238000 | VERBAL RESPONSE |
| Johnson | Northwest Region | X | Y | $942,000 | $1013500 | VERBAL RESPONSE |
| Carlson | California Region | X | Y | $1,468,000 | $1435000 | NO RESPONSE |
| TOTAL | | | | $9,707,500 | $9147500 | |

The next meeting of the sales managers will be Sept. 14th. Can you attend? {Y N}

The forcasts are now due. Pease enter your forcast for the next year { # }.

Please enter the name of the sales person who has improved the most in the past year. { A-Z }

Thank you for your prompt attention and responses to this E-mail.

Figure 12

560 { Message to: RECIPIENT
Message from: SENDER
Subject: EXAMPLE

564 { This message contains questions you may respond to. Where the phrase "{ Y N }" appears erase the Y or the N to leave the remaining letter to indicate a yes or a no. Where the phrase "{ # }" appears erase the # and replace it with a numeric entry. Where the phrase "{ A-Z }" appears replace the A-Z with a textual response. Please return the message with no changes to the subject or the text. The Message follows:

The next meeting of the sales managers will be Sept. 14th. Can you attend? {Y N}

530 —

The forcasts are now due. Pease enter your forcast for the next year { # }

Please enter the name of the sales person who has improved the most in the past year. { A-Z }

538 —

Thank you for your prompt attention and responses to this E-mail.

| Name | Sales Area | Response | Can you attend Sales Meeting? | Forecast for Next Year | Most Improved Salesperson |
|---|---|---|---|---|---|
| Wilson | Northeast Region | X | Y | $1,052,000 | B. Martin |
| Baker | East Coast Region | X | Y | $1,423,500 | S. Hiller |
| Helprin | Southeast Region | X | Y | $1,005,000 | B. Gorman |
| Adamson | Florida Region | X | N | $1,230,000 | W. Verly |
| Meyers | North Central Region | X | Y | $851,000 | L. Watson |
| Foster | Midwest Region | NO | | | |
| Martinez | Texas Region | X | N | $1,756,000 | F. Davison |
| Johnson | Northwest Region | X | Y | $942,000 | H. Westrupt |
| Carlson | California Region | 1X | Y | $1,468,000 | NO RESPONSE |
| TOTAL | | | | $9,727,500 | |

MESSAGING SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to automatic messaging systems and more particularly to a method and apparatus which, when a user poses questions to other system users, requires responses having a specific form and automatically generates a response table which is viewable via a display screen and which arranges responses in an orderly fashion. In our current economic climate it is often extremely difficult to make direct contact with an individual. This is particularly true in the business environment where, in many cases, people are traveling or at intra-office meetings more than they are in their own offices. The realities of busy schedules often mean that the only way to communicate with a person is to leave a message and wait for the message recipient to get back via telephone or the like. Communication is often expedited by leaving messages which specify information sought. In this manner, if the original message sender is not available when the recipient calls back, the recipient can leave a response message including the information sought.

For a long time most offices relied on, and to this day some offices still rely on, manual message protocols wherein, in the absence of an intended recipient, a personal assistant transcribes messages longhand. Manual protocols have at least three shortcomings.

First, these protocols are often unreliable as an assistant may fail to transcribe a message, may misplace a message or may place a message in an unexpected location where it is not later located by the intended recipient.

Second, these protocols are relatively expensive, especially in modern offices where message taking is usually only one of many different tasks an assistant is expected to perform.

Third, even if messages are transcribed accurately and placed in an expected location, there is no way for the intended recipient to access the message information without either being physically present in the expected location or contacting an assistant to access the information. This makes these systems virtually unworkable, especially for business people who are typically out of the office for several days at a time. Access problems are compounded by the fact that many people may only have time to check messages after typical business hours when an assistant is unavoidable.

To improve communication several voice messaging systems have been developed which facilitate remote messaging and remote retrieval of messages. Two particularly popular systems are referred to as voice mail and E-mail systems.

With voice and E-mail systems, each system user has a system account and an associated voice or E-mail "box", respectively. A mail box is a virtual location in an electronic memory where messages are started. Voice mail is typically used with a standard phone system. With voice mail, when a person calls another person and the person called is not available, the voice mail system answers the call and instructs the caller to leave a message. The caller then verbally articulates the intended message and the system stores the message in the other persons voice mail box for later retrieval by the person called.

With E-mail, messages are typically generating using a computer terminal or the like and are then sent to an intended recipient via a telephone line or an Internet link. The recipient's computer (or network) receives and stores the E-mail message in the recipient's E-mail box. The recipient can retrieve the E-mail message at any time after storage.

Many additional features have been developed which add value to electronic messaging systems. For example, to protect messages from unauthorized access, when a user accesses either a voice mail or an E-mail system, the system requires the user to enter some form of identification information to retrieve or send messages. Typically the identification information will include a personal identification number (PIN).

Another useful feature is that most systems allow a single message to be sent to a list of recipients. This feature makes it easy to communicate with several recipients at the same time. This feature is particularly useful in cases where a message sender needs to obtain information of the same kind from a plurality of different system users.

Yet another advantageous system feature allows a system user to observe mail summaries on a CRT screen or the like. The user can judiciously select which of the messages should be observed immediately, which can be observed later and which can be discarded without further review. While this is a standard feature associated with most E-mail systems, this feature can also be used with voice mail systems as described in U.S. Pat. No. 5,003,577 entitled VOICE AND DATA INTERFACE TO A VOICE-MAIL SERVICE SYSTEM which issued on Mar. 26, 1991.

While voice and E-mail systems have many clear advantages over manual messaging protocols, voice and E-mail systems also have a number of short comings. First, when a message initiator sends a message to a system user requesting several pieces of information, the recipient may respond in a manner that differs from the order in which the information was requested or may not leave all requested information. This is particularly true in cases where many different pieces of information are required from the recipient.

Second, a recipient may respond to a message in a manner which is difficult to understand or includes a lot of extraneous information which was not requested by the message initiator. For example, if a sales manager requests projected sales information from a sales representative, the representative may leave a message which, in addition to the sales information, rambles on about last weeks football game, problems with the representatives new automobile, or anything else on the representatives mind. Rambling responses make it extremely difficult for the message initiator to extract required information which, in many cases, will be buried somewhere within a verbal response. This is also true of E-mail systems except that, instead of listening for a verbal response for requested information, a textual response must be searched or visually scanned.

In addition, even when required information is provided at the beginning of a response, unless the entire response is listened to or read, there is no way to determine if other important but unrequested information is provided in the response. Thus, a message initiator and response receiver must peruse an entire response to extract requested information and determine the import of other message information.

Third, when one message including several questions is sent to several recipients, recipients may respond in different orders. For example, where a message includes five different areas of inquiry and the message is sent to twenty sales representatives, a first representative may answer the questions in order, a second representative may answer the questions in reverse order, a third may answer the third question first, the second question second, the first question third, the fifth question fourth and the fourth question fifth, and so on. In addition to making it difficult to understand such a message, in such a case it would be extremely difficult at best to collect and manually organize such responses in an intelligent manner.

One solution to these problems is described in U.S. Pat. No. 4,602,129 which is entitled ELECTRONIC AUDIO COMMUNICATIONS SYSTEM WITH VERSATILE MESSAGE DELIVERY which issued on Jul. 22, 1986. That patent describes a system wherein a user uses a telephone to formulate a questionnaire including several different questions. The system delivers the questionnaire to designated system users. When a recipient retrieves the questionnaire, the system steps the recipient through the questionnaire, one question at a time. After a question has been articulated, the system waits for the recipient to enter a response via the telephone keypad or via voice annunciation, whichever is appropriate. The system stores the responses. Then, when the questionnaire initiator re-accesses the system, the initiator can retrieve the responses and listen thereto via a telephone.

Another useful aspect of this system is that it allows the questionnaire initiator to designate types of acceptable responses. For example, certain questions may require a YES or NO answer, others may require a numeric answer, while still others may require a verbal response. The initiator can designate acceptable response types accordingly.

While this solution addresses many of the problems described above, this solution also has many disadvantages. For example, assume a regional sales representative for a software company needs twenty subordinate sales representatives to provide answers to seven different questions. Also assume that it is 4:00 PM on Thursday and the answers must be received and tallied for presentation to a national manager, by 10:00 AM on Friday morning.

While the solution in U.S. Pat. No. 4,602,129 and summarized above facilitates questionnaire formation and administration and orderly responses, that solution requires that the representative listen to many different messages to retrieve required information. In the example, the regional representative must listen to twenty different response messages, each message including seven different responses. In addition, to keep track of which questions are being responded to, the representative may also have to listen to each or at least some of the questions prior to each response.

Only after listening to each subordinate representative's responses can the regional representative determine if each of the seven questions has been answered. Moreover, only after having listened to all received responses can the representative determine if all twenty subordinate representatives responded and, if not, which representatives failed to respond.

After responses have been received, the regional representative listens to the responses and, while listening, must tally the responses. After the tally is complete, the representative must then enter the tallied information in a spread sheet or the like to generate a formal presentation for the national manager.

Clearly response retrieval with the described system is extremely time consuming and tedious work. In addition, in the example above, many of the subordinate representatives may not provide a response until Friday morning which would make the 10:00 AM deadline extremely difficult, if not impossible, to meet.

Therefore, it would be advantageous to have an electronic messaging system which facilitates easy examination of question responses in a response table tailored for a specific questionnaire. In addition, it would be advantageous to have a system which automatically forms the response table including tallied responses.

BRIEF SUMMARY OF THE INVENTION

The present invention includes a system which, when a questionnaire is formed, automatically generates a table for visual display of subsequently received questionnaire responses, the table format dependent on the number of questions in the questionnaire, the number of questionnaire recipients and the types of questions in the questionnaire. Prior to receiving responses, response elements in the table indicate that a response has yet to be received. As responses are received, corresponding response elements are updated to indicate responses.

It is the object of this invention to provide an improved means of preparing messages so that questions may be presented to the recipient in a format that allows them to provide appropriate responses as desired and that the responses may be automatically collected, tabulated, and presented for review. It is also the purpose of this invention to be compatible with existing messaging systems; voice mail, automatic message forwarders, or E-mail systems.

To use the system in a verbal messaging environment, the sender may identify the recipient by a telephone number or other address. The message to be sent may then be spoken and recorded. When the sender poses a question to the recipient, the sender after stating the question may press a special key on the telephone key pad, for example the star, "*", key and a code number on the numeric keypad on the telephone. To request a yes or no response, the sender may press the star key and a one key. To request a numeric response, the sender may press the star key and a two key. To request a verbal response, the sender may press the star key and a three key. The sender may then continue with their verbal message and then send it.

The recipient may receive and listen to the message. After the recipient hears a question where a response is desired an automated computerized voice may present the recipient with the desired choices for response. If the question requests a yes or a no, the recipient will be requested to press the 1 key for a yes, a 0 for a no, and perhaps the star key for no response. If the question requests a numeric response, the recipient may be requested to enter the number followed by a star key to terminate the entry. The recipient may speak their response and a voice recognition system may convert the spoken response to the appropriate yes or no or numeric response. If the question requests a verbal response, the recipient will be requested to state their response followed by a star key to terminate the entry. After making an appropriate entry the recorded message will continue until the next question is presented. When finished listening to the message and providing responses the recipient may instruct the message system to return the message with their responses to the sender.

The sender when they receive the returned message and responses may listen to the message or just portions of it prior to the questions. The yes-no and numeric responses may be spoken as by an automated computerized voice. Questions posed requesting a verbal response may replay the recipient's stated answer.

In the instance that the same message is sent to multiple recipients, each of the responses may be collected by a computer program that can detect the identity of each recipient and the responses made to the questions posed. The responses may be entered in the appropriate location in a table, for example a cell in a spreadsheet. The sender may then refer to the spreadsheet created to review all the responses in a uniform presentation and to determine which recipients have not yet responded. The responses may also be used to create appropriate graphical charts or diagrams. When a spread sheet or graph is created, names and/or titles of the recipients may be specified so the presentation is easier to read, for example if the recipient is known as Wilson, a corresponding spread sheet entry may instead use the phase Northeast Region, if Wilson represents the northeast region. In this manner the sender will not need to listen to each of the responses to collect the desired information and the recipient need only have access to a standard keypad telephone to provide data.

A similar scheme may be used with a message forwarding system, where a message with posed questions is sent to a recipient to respond to. An example of the this may be used in sending a message to a recipient in a distant time one and the message is to be scheduled for delivery to that recipient at a latter time when they are likely to be available. Any responses given can be recorded by the message forwarding system and presented back the sender.

The same concepts may be used to pose questions and receive answers using an E-mail system. The sender may write their message as usual, but where a yes or no response is desired they may enter the phrase "{Y N}", where a numeric response is desired they may enter the phrase "{#}". and where a textual response is desired they may enter the phrase "{A–Z}". The recipient when receiving the message as an E-mail may also be presented with instructions to leave only the "Y" or the "N" in the yes or no response areas, to replace the "#" and enter the desired number in those areas requesting numeric responses, and to replace the "A–Z" with the desired textual response in those area requesting such response. When the E-mail message has been read and responded to, the recipient may return it to the sender. The sender's E-mail presentation program may display the original message and responses. It may also enter each response into a spreadsheet cell so that several recipients' responses to the same E-mail message may be automatically tabulated. This will relieve the sender from having to read each returned message and manually enter the results in a spreadsheet or chart and removes the possibility of introducing transcription errors.

A final use of this messaging technique is to allow a deaf person having a TTD or a personal computer to present questions to a hearing person who does not have compatible receiving equipment. The deaf person may specify who they want to send the message to, enter the message into the TTD or personal computer, and send it to a message forwarding system that can take the message and convert it to a computerized voice. Where the sent message poses a question the playback of the message may be stopped and a computerized voice may request a the appropriate response. When the recipient has listened to the message and responded to questions the entire message with responses may be presented to the sender on their TTD or personal computer. A combination of techniques may be used if the deaf person can verbally state their message and indicate a response is desired by the use of the telephone keypad phrases described above. The responses may be returned to a TTD or personal computer for review, but the spoken original message will not be useful. This system may be modified so that a personal computer used by the deaf person may be used to convert typed text to computerized speech and immediately transmit the message to the hearing recipient. When a question is posed the sender may wait for the response to be entered, interpreted, and presented on the personal computer. In this manner a deaf person may have a limited conversation with any hearing person with out the need for an intermediate person to listen and transcribe the responses so the deaf person can read them on their TTD or personal computer.

BRIEF DESCRIPTION OF THE SEVERAL VIEWS OF THE DRAWINGS

FIG. 5 is a textual representation of a recorded spoken message with embedded questions;

FIG. 6 is a textual representation of a recorded spoken message as presented to a recipient;

FIG. 7 is a visual display of a response table in spread sheet form which is automatically generated according to the present invention based upon a voice message with embedded questions;

FIG. 8 is a visual display of the list of outgoing messages;

FIG. 9 is a response table with responses entered;

FIG. 11 is a response table after modification with responses entered;

FIG. 12 is an E-mail message with embedded questions;

FIG. 13 is a an E-mail message as received with instructions added to assist a recipient in responding; and FIG. 14 is a response table with E-mail responses entered.

DETAILED DESCRIPTION OF THE INVENTION

A. System Hardware

Figure 1:
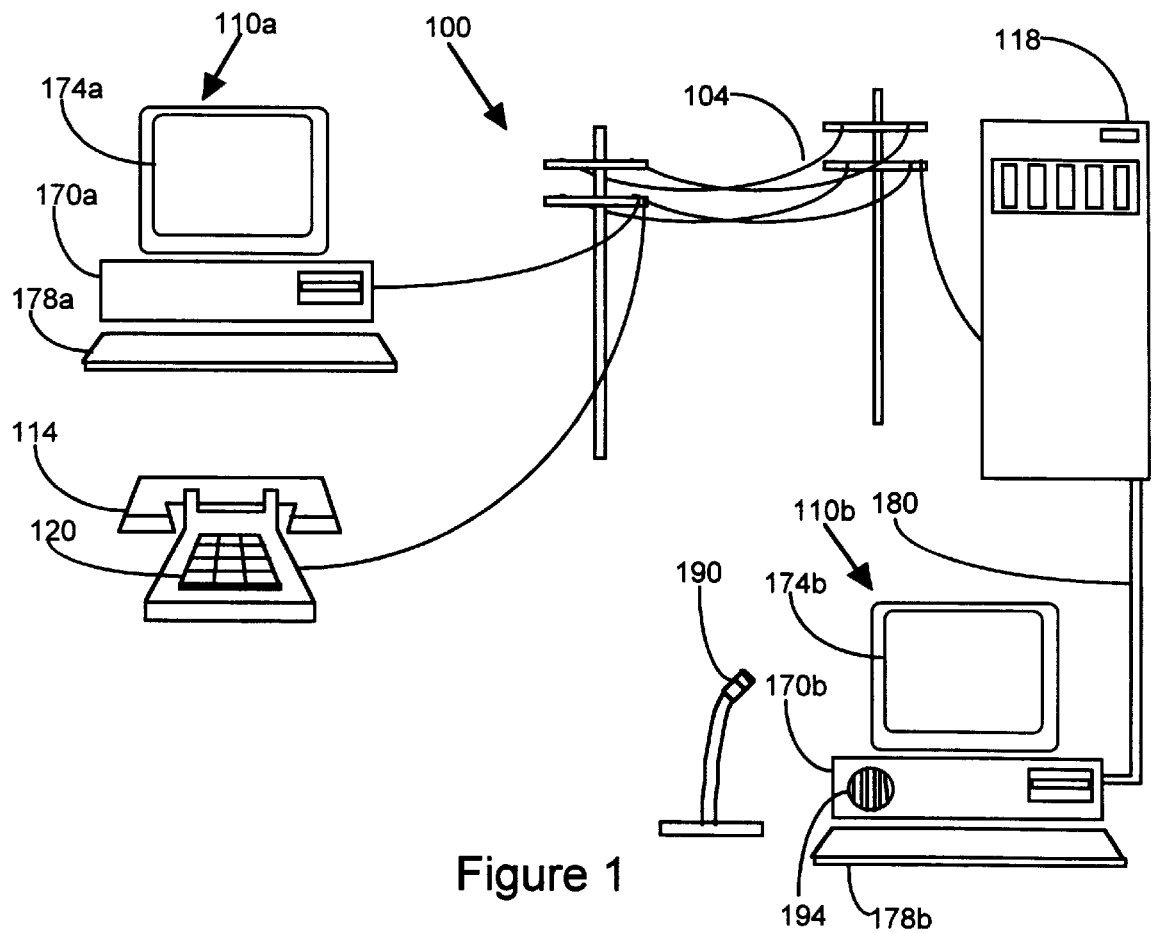
FIG. 1 is a schematic diagram of communication system hardware.

Referring now to the drawings, wherein like reference characters represent corresponding elements throughout the several views, and more specifically referring to FIG. 1, the present invention will be described in the context of a conventional communication system 100. System 100 includes a data transfer network 104, at least one communication terminal (two are illustrated 110a, 110b), a plurality of telephones 114 (one is illustrated) and at least one network server 118.

Network 104 can be public or private and includes standard telephone lines, a cable television network, and/or a computer network such as the Internet which can be used to link together various types of communication appliances (e.g. telephones, computers, thin clients, etc.) for electronic data transfer.

Figure 2:
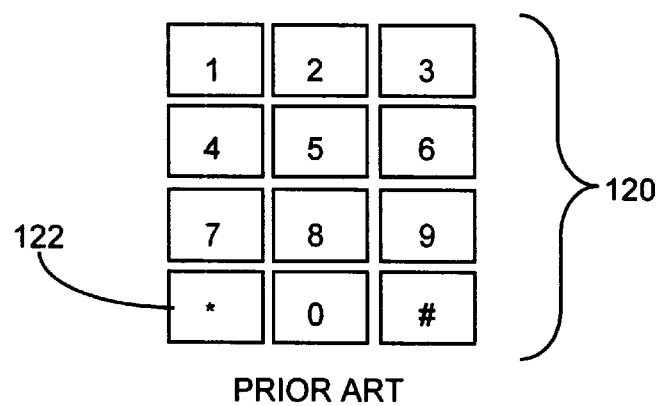
FIG. 2 is a schematic diagram of a conventional telephone keypad.

Referring also to FIG. 2, each telephone 114 is a tone type telephone, is linked to network 104 and includes a standard keypad 120.

Figures 3, 4:
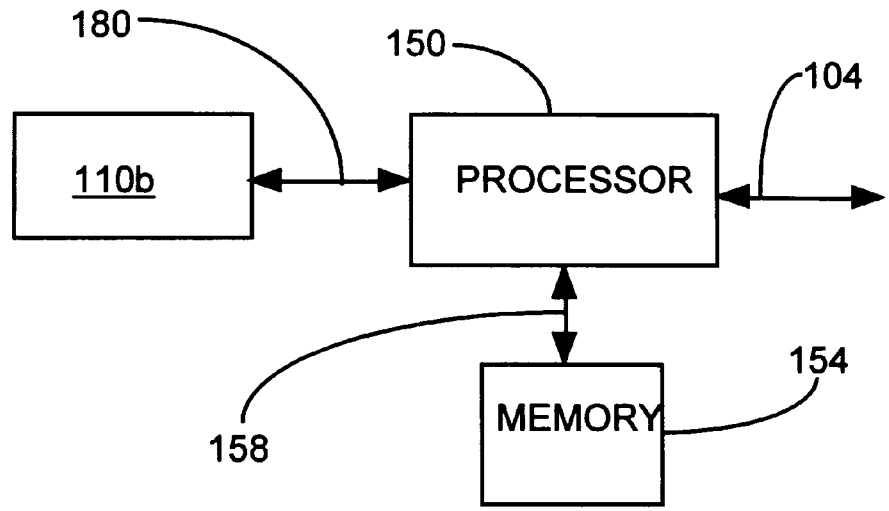
FIG. 3 is a block diagram of a message server.
FIG. 4 is a visual display of a response table in spread sheet form which is automatically generated according to the present invention before any message or questions are posed.

Referring still to FIG. 1, server 118 is preferably a voice mail server. Referring also to FIG. 3, server 118 includes a processor 150 and a memory 154. Memory 154 includes a plurality of voice mail boxes which receive and hold voice messages until a box owner collects her messages. In addition, memory 154 is a general purpose memory for use by processor 150 in administering the voice message system. In this capacity, memory 154 includes user PIN numbers, can be used to store questionnaires, can be used to store questionnaire response tables, includes outgoing/incoming message ques, may include additional data which can be correlated with system user PIN numbers, etc.

Processor 150 is linked to memory 154 by a two way bus 158 such that processor 150 can access and change information in memory 154. In addition, processor 150 is linked to network 104 so that server 118 can receive voice messages from any network telephone 114 and so that server 118 can provide messages to system users via system telephones 114.

Terminals 110a and 110b are personal computers or other similar workstations (e.g. network computers (NCs), thin clients, etc.). For the purposes of this explanation, it will be assumed that each terminal 110a and 110b is a "thin client" which means that the terminal itself does not perform many conventional computer tasks. Instead, each terminal 110a and 110b facilitates data entry into server 118 and facilitates information output from server 118. Each terminal 110a, 110b includes a simple processor 170a, 170b to facilitate data transfer, a display 174a, 174b and a human interface for data entry/cursor control. Preferably each interface is a mouse (not illustrated) or a keyboard 178a, 178b. One or more terminals 110a can be connected directly to network 104 via a modem or the like. In addition, one or more terminals 110b may be connected directly to server 118 via suitable computer network 180.

Terminal 110b also includes a microphone 190 so that audible information can be received by processor 150. In addition, terminal 110b also includes a speaker 194 so that audible information sent from server 118 can be received and be generated by processor 170b.

B. Inventive Method

Processor 150 receives messages entered using either a telephone 114 or a terminal 110a or 110b. While some received messages may not require a response, the invention allows a message initiator to pose several questions, require responses and issue the questions to several designated system users. As users are designated and questions are composed to form a questionnaire, processor 150 automatically tailors response table 200, FIG. 4, specifically for the questionnaire. After the questionnaire is formed, processor 150 delivers the questionnaire to specified recipients, receives responses to the questionnaire, maps the responses to response table 200 and provides response table 200 to a terminal for viewing.

1. Questionnaire Entry

In the description which follows it will be assumed that an initiator uses telephone 114 to initiate a questionnaire and uses terminal 110b to edit the questionnaire and response table 200 and also uses terminal 110b to observe response table 200.

To form a questionnaire, the user accesses server 118 via telephone 114. Upon reaching server 118, server 118 requests the user to input her PIN. Processor 150 receives the PIN and determines if the user is a system user by comparing the PIN with PINs in memory 154.

If the user is not a system user, processor 150 verbally indicates that the user cannot access the system and thereafter terminates communication. If the PIN matches a system PIN, processor 150 gives the user a list of system options including, among other options, the abilities to listen to messages in the users mail box, to designate other system users to receive a questionnaire and to generate a questionnaire. Each of these options may be tied to a specific key on the telephone keypad 120 (see FIG. 2). For example, by pressing the "1" key the user may listen to messages, by pressing the "2" key the user may be able to designate other users and by pressing the "3" key the user may be able to verbally enter a questionnaire.

When a questionnaire initiator elects to designate a subset of system users, processor 150 allows designation. To this end, processor 150 may be preprogrammed with specific user subsets which can be designated by the user or may allow the user to individually designate system users to form a subset. Individual users can be designated in any manner known in the art and therefore will not be explained here in detail. For the purposes of this explanation it should suffice to say that one way to designate separate users is to individually enter user telephone extension numbers (e.g. 1234), each followed by a special key (e.g. "*") indicating that an extension has been entered. Regardless of whom is designated, the initiator must provide some user subset indicator indicating designated users.

After designating a user subset by entering an indicator, the initiator can enter a questionnaire. To this end, the user selects the questionnaire formation option via telephone 114. To generate a questionnaire, in a preferred embodiment, processor 150 must be provided with each question and must also be instructed as to what type of answers are suitable for each question. To this end, the initiator articulates each question and, after each question uses keypad 120 to indicate the end of the question and to identify the type of response required. For example, to indicate the end of a question, the user may be instructed to press "*". To indicate response type the user may be instructed to press "1", "2" and "3" keys for YES/NO, numeric and verbal responses, respectively. Thus, when a YES/NO answer is required, the initiator may type "*1", when a numeric answer is required, the initiator may type "*2" and when a verbal response is required, the initiator may type After a questionnaire has been entered, the user indicates that the questionnaire is complete by pressing a designated sequence on keypad 120 keys (e.g. "#*#") at which point processor 150 stores the table format in memory 154 for later use.

Processor 150 receives questionnaire questions and response type indicators and generates a complete questionnaire which is delivered to each mail box associated with a user designated in the subset. The questionnaire is placed in a message que in each mailbox.

2. Table Formation

During user designation and questionnaire entry, processor 150 forms response table 200 specifically tailored to visually present subsequently received responses to the questionnaire on a video display (e.g. display 174b). To this end, preferably, response table 200 includes user rows and various columns. Referring to FIG. 7, during user subset designation, processor 150 receives each designation separately and generates a table row corresponding to each user. Initially, each row only includes a single user element corresponding to an associated designated user. In FIG. 7, user elements are collectively identified by numeral 205. The user elements form a user column 206. Some user identifier corresponding to a designated user is entered in each user element 205. For the purpose of this explanation, it will be assumed that the user identifier is the user's four digit telephone extension.

After user subset designation and during questionnaire entry, each time a question and response type indicator are entered, processor 150 adds another column to the table, each new column referred to herein as a question column. In FIG. 7, there are three question columns 210, 212 and 214. Each question column 210, 212 and 214 includes a number of response elements (not separately identified in FIG. 7) equal to the number of user elements, one response element corresponding to each user row. Response elements which correspond to a user element are placed in the user row.

Initially each response element is empty indicting that a corresponding user has not yet considered the question and therefore has not responded.

3. Answering Questionnaire

After the questionnaire has been entered, processor 150 provides the questionnaire to designated subset users. The questionnaire remains undisturbed in each user's mail box until accessed.

To access the questionnaire, a recipient accesses processor 150 via a telephone 114 and enters the user's PIN. Assuming a valid PIN, processor 150 provides the recipient the same set of options provided to the initiator (i.e. listen to messages, designate a user subset and enter a questionnaire). After a user opts to listen to messages, processor 150 articulates messages stored in the recipient's mail box in the order in which they were received.

When the questionnaire comes up in the stored message que, processor 150 presents the questionnaire one question at a time. After each question is articulated, processor 150 verbally indicates the required response type and, in some cases instructs the recipient on how to respond. In other words, when a YES/NO answer is required, processor 150 indicates so and may indicate that a YES answer can be selected by pressing a "1" key and that a NO answer can be selected by pressing a "0" key. Similarly, when a numeric or voice response is required, processor 150 indicates so.

The recipient responds in the required manner. After a response has been provided either processor 150 recognizes that the response is complete or the recipient indicates the end of a response by pressing a specific key on keypad 120 (e.g. "*"). For example, if the required response is a YES/NO response, a "1" indicating YES and "0" indicating NO, after a "1" or "0" has been pressed, processor 150 identifies a complete response and can continue with the questionnaire. On the other hand, when a verbal response is required, processor 150 must be told when the response is complete. To this end, after a response has been provided, the recipient responder presses the "*" key. Processor 150 recognizes the end of a response to a specific question, stores the response in a user message packet and then proceeds with the next question in the questionnaire. A recipient may elect not to provide a response to one or more specific questionnaire questions by selecting a specific k
on keypad 120 (e.g. "#").

As questions are answered, processor 150 stores responses corresponding to a single user in a user message packet. In addition to the responses, each message packet also includes a user identifier segment used by processor 150 to identify the recipient responder. Typically, the user identifier segment will include the recipient's extension number. After the last question in the questionnaire has been answered, processor 150 completes the message packet and stores the packet in memory 154 for later mapping into a table.

If a recipient accesses a questionnaire and fails to consider all questionnaire questions, processor 150 stores an abbreviated message packet including responses only to answered questions. In addition, if a question is considered and a recipient elected not to provide an answer, processor 150 includes a message packet entry indicating that the question was considered and that no answer was provided.

4. Viewing And Mapping Responses To Table

At any time after forming a questionnaire, the initiator can use terminal 110*b* to access a corresponding response table 200 and identify the status of received responses. After entering a correct PIN via terminal 110*b* the initiator uses keyboard 178*b* to select response table 200 for viewing via display 174*b*. When the table is selected for viewing, processor 150 provides the table on display 174*b*, including the user column and received responses in question columns. Prior to receiving a response, a corresponding response element is blank indicating that the specific question has not been considered by the intended recipient.

After one or more message packets have been received and stored in memory 154, when an initiator elects to observe a corresponding response table 200, processor 150 identifies message packets corresponding to the elected response table 200, separates the packets into responses, a separate response corresponding to each questionnaire question for each responder. The responses are then mapped to response table 200. Specifically, each response is mapped to a response element associated with a corresponding question column and a corresponding user row. For example, a fourth recipients response to a third question would be mapped to the fourth user row and third question column.

When a YES/NO answer has been received, the mapped response indicates YES or NO accordingly. When a numeric response has been received, the numeric response is mapped to a corresponding response element. When a verbal response has been provided, a message indicating a verbal response (e.g. "VERBAL RESPONSE") is mapped to the response element.

When a recipient considered a question but elected not to respond, processor 150 maps a message to a corresponding response element indicating that the recipient elected not to respond to the question (e.g. "NO RESPONSE"). If a question was never considered, processor 150 leaves a corresponding response element blank.

5. Other Features

Other features of the inventive system facilitate more complex and more informative table configurations. For example, a header row can be automatically generated which includes a USER, NAME or EXTENSION header at the top of the user column and various question text identifying headers (e.g. QUESTION 1, QUESTION 2, etc.) at the tops of each question column.

In addition, the initial table format can be altered in several different ways using terminal 110*b*. For example, while it is difficult to enter alphabetic information using a telephone, it is easy to enter numeric information. Therefore, when designating a user subset, instead of designating via alphabetic entry of names, users are preferably designated via PIN, telephone extension or other numbers. Then, when processor 150 receives the user identifier numbers, processor 150 accesses memory 154 to correlate user names with identifier numbers, providing user names 217, instead of elements 205, in user elements during mapping (see and compare user-columns 206 in FIGS. 6 and 10).

Similarly, other information stored in memory 154 can be correlated with user identifier numbers and provided in response table 200. For example, additional columns of information can be added to the table. To this end, additional information which corresponds to each user in the subset can be stored in memory 154. After the initial table is formed, the initiator can select the type of additional information to be included in the table and can specify where (e.g. in which column or between which columns) in the table the information should be included. Once additional information has been selected and the position in the table for the additional information has been specified, processor 150 automatically shifts columns after the selected position, creates an additional column and stores the modified table format in memory 154.

Subsequently, when an initiator elects to view the modified table, processor 150 accesses the modified table format in memory 154, any received message packets and the selected additional information, maps the additional information to corresponding elements in the additional column, separates the message packets into responses, maps the responses to corresponding question columns including the shifted columns, and displays the modified table via display 174b.

Moreover, after the initial table format has been stored, an initiator can add or remove users from the user subset, add an additional question to the questionnaire or edit a questionnaire question. Examples of each of these types of edits are described in more detail below.

C. Operation

The present invention can best be understood by considering an example of the inventive method. It should be noted that the present example is purposefully simple in order to simplify this explanation and that more complex operations are contemplated by the invention. In fact, it should be recognized that the advantages associated with the present invention are greatest when a complex questionnaire is to be formed, administered, and answered and responses are to be displayed.

In the present example, a national sales manager generates a questionnaire to be answered by nine separate regional sales representatives, each regional representative managing several additional sales representatives. The questionnaire includes three questions and the answers to the questions must be tallied in a table for formal presentation. First, the manager needs to know if the each regional representative will be able to attend the next sales meeting. Second, the manager needs to known this years sales forecasts. Third, the manager needs to know who has been the most improved sales representative in the past year for each of the regions.

Each regional representative has a user identifier which consists of the representatives four digit telephone extension. Memory 154 includes a user subset already designating each of the nine regional representatives as members of the subset, each representative designated by extension number. In addition, memory 154 includes several other types of information which are correlated with extension numbers. For example, among other information, regional representative's last names and current year forecasts are correlated with extension numbers.

Initially, using telephone 114 the manager calls server 118 and enters her PIN using keypad 120 to gain access to processor 150. Assuming a correct PIN, processor 150 articulates options "Listen to messages, press 1.", "Designate user subset, press 2" and "Enter a questionnaire, press 3".

Initially the manager selects "2" to designate a user subset to receive a questionnaire. When "2" is selected, processor 150 articulates the question "Is a preselected user subset is to be used or do you intend to designate each individual in a subset separately?" The manager elects to use a preselected subset. Processor 150 indicates possible preselected subsets and how each can be selected using keypad 120. The manager selects the user subset corresponding to the nine regional representatives. Because the subset corresponds to the regional representatives the subset includes nine separate user identifiers, each user identifier being a telephone extension number.

After the subset is selected, processor 150 takes the first step in forming a response table. To this end, referring also to FIG. 4, processor 150 generates response table 200 including a user column 206 having nine separate column elements collectively referred to by the numeral 205. Elements 205 include a separate element for each user identifier included in the designated user subset. Each element 205 corresponds to a separate user row in which answers to questionnaire questions will be displayed. In the present example, processor 150 also generates a status column 218 including a separate status element for each user row. The status elements indicate if a recipient has responded to a questionnaire or not. Initially, all entries in the status column 218 are "NO" because no questions have been answered.

Processor 150 also generates a header row 230 which, at this point, only includes a header element 232 "EXTENSIONS" above user column 206 indicating that entries therein are user extensions and a header element 220 "RESPONSE" above the status column 218 indicating that entries therein indicate whether or not a response has been received.

After the user subset has been selected, processor 150 returns to the original menu providing options "Listen to messages, press 1", "Designate user subset, press 2" and "Enter a questionnaire, press 3". The manager presses key "3" to enter a questionnaire.

Processor 150 verbally instructs the manager to "Annunciate the first question." As the first question is annunciated, processor 150 records the question. At the end of the question the manager presses the "*" key 122 (see FIG. 2) indicating that the end of the question has been reached. Then, the manager presses either a "1" key, a "2" key, or a "3" key indicating that the required response form is a YES/NO, a numeric, or a verbal response, respectively. After the "1", "2", or "3" key has been pressed, processor 150 verbally instructs the manager to enter the next question.

In the example considered here, referring to FIG. 5, the questionnaire 234 entered via telephone 114 is textually illustrated even though it is verbally spoken. Questionnaire 234 includes three questions, each including a type indicator (i.e. a "1", "2", or "3") indicating the type of response required. The first question asks about availability for the upcoming meeting, requires a YES/NO response and therefore is followed by a type indicator "1" 240 indicating a YES/NO response. The second question asks about sales forecast, requires a numeric response and therefore is followed by a type indicator "2" 242. The third question asks about most improved sales representative, requires a verbal response and therefore is followed by a type indicator "3" 244.

After each question has been entered, processor 150 provides a new question column in response table 200 which corresponds to the most recently entered question. Each new question column includes a separate response element corresponding to each user element 205. Referring again to FIG. 7, in the present case, because the questionnaire includes three separate questions, three separate question columns are generated including columns 210, 212 and 214. Because there are nine user elements, each question column includes nine separate response elements. In addition, processor 150 also fills out header row 230 by generating question header elements 250, 252 and 254 and filling them with appropriate entries. Initially, all response elements are blank because no responses have been provided.

Processor 150 stores questionnaire 234 and response table 200 in memory 154 and uses questionnaire 234 to generate questionnaire 270 (see FIG. 6). Questionnaire 270 includes the questions as provided by the initiator and also includes verbal standard instruction sets 274, 278 and 282 which instruct questionnaire recipients how to answer the questions. Questionnaire 270 is delivered to the mail boxes of the designated user subset.

Referring to FIG. 6, when the designated regional representatives access their mail boxes on server 118 and elect to listen to questionnaire 270, processor 150 steps each manager through questionnaire 270, one question at a time. The first question in questionnaire 270 which corresponds to the first question in questionnaire 234 is played for the representative followed by a standard instruction set indicating the type of answer required. In the present example, after the first question has been played, because the response must be in YES/NO form, processor 150 indicates so by verbally stating "Please enter a 1 for Yes or a 0 for No or press the star key" instruction set 274.

After the first question has been answered, processor 150 plays the second question for the representative followed by another standard instruction indicating the type of answer required. Because the manager limited answers to the second question to numeric answers, processor verbally states "Please enter a number followed by the star key" instruction set 278.

After the second question has been answered, processor 150 plays the third question for the representative followed by yet another standard instruction indicating the type of answer required. Because the manager limited answers to the third question to verbal answers, processor 150 verbally states "Please respond, press the star key when done" instruction set 282.

As the recipient listens to questionnaire questions and responds thereto, processor 150 receives the responses and generates a message packet including a recipient identifier (i.e. recipients extension number) and all of the responses from the recipient. When the recipient is finished responding to the questions, processor 150 stores the message packet in memory 154 for later mapping.

In addition to using the present invention to generate a single questionnaire, system 100 can be used to generate several standard voice mail messages and also to generate and process more than a single questionnaire. When a system user generates more than one questionnaire or message, the questionnaires and messages are stored in an outgoing message que. The outgoing message que can be observed via display 174b.

Referring to FIG. 8, screen 290 for displaying the outgoing message que is illustrated. Screen 290 includes an initiator identifier element 294 and a table 300. Table 300 includes three columns including a message column 304, a time column 308 and a response column 312. Message column 304 includes a separate entry for each message or questionnaire in the outgoing message que indicating the recipient of the message or questionnaire. The first two entries 316 and 320 in message column 304 indicate messages sent to single extensions corresponding to single system users. The entry 324 in message column 304 indicates that the message was sent to a user subset. Time column 308 simply displays the time and date on which a corresponding message in message column 304 was sent.

Response column 312 indicates whether or not a response to a corresponding message was required. Where a response is required, the message is a questionnaire and where a response is not required, the message is a typical voice mail message. The second and third entries in response column 312 correspond to questionnaires requiring responses. For the purposes of the present invention it will be assumed that the group message indicated at entry 324 corresponds to the questionnaire in the present example.

To display response table 200 corresponding to entry 324, with screen 290 displayed on display 174b, the manager uses keyboard 178b to move a cursor or arrow to the point where the arrow designates entry 324 and presses a selection key (e.g. typically an "ENTER" key). Software for cursor control and on screen selection is well known in the computer arts and therefore will not be explained in detail here.

By selecting entry 324, the manager selects response table 200 and processor 150 displays response table 200 on display 174b. In the present case, referring to FIG. 7, initially all of the response elements are blank because no answers have been received. In addition, for this same reason, status column 218 will be filled with "NO" entries indicating that no responses have been provided.

Subsequently, after message packets including responses to questionnaire 270 have been stored, when the manager selects entry 324 to display screen 350, processor 150 separates the packets into separate user identifiers and responses and maps those identifiers and responses to appropriate response elements. For example, referring to FIG. 9, responses from the first user in the subset corresponding to extension 5574 include "YES", "1052000" and a verbal response indicated by the entry "VERBAL RESPONSE" 356. In this case, processor 150 maps user identifier 5574 (i.e. the users extension) into a user element in user column 206 and maps the corresponding responses into the user row corresponding to the user element designated by extension 5574. Other responses are mapped in a similar fashion so that they correspond to associated user identifiers in user elements.

In FIG. 9, all users in the designated subset except the user associated with extension number 4561 have responded. When responses are received, an "X" is mapped to an element in column 218 which corresponds to the extension. Thus, an "X" appears in column 218 in each user row except the row corresponding to extension 4561. A "NO" entry 360 corresponds to extension 4561.

In addition, in FIG. 9, while the user having extension 5322 responded to the questionnaire, that user elected not to respond to question 3. Therefore, answers to questions 1 and 2 are mapped to appropriate columns 210, 212 and a "NO RESPONSE" entry 364 is mapped to column 214.

At this point it should be appreciated that the inventive processor can facilitate formation of a questionnaire, administer a questionnaire, receive responses and automatically generate a simple response table 200 as illustrated in FIG. 9. response table 200 is simple to understand and simplifies the task of identifying specific question responses.

With respect to verbal responses, the present invention facilitates listening to the responses. To this end, with response table 200 on display 174b, the manager uses keyboard 178b to designate the VERBAL RESPONSE entry corresponding to the response the manager would like to hear. Then, pressing the activation key terminal 110b plays the response via speaker 194.

In addition to the basic table format illustrated in FIG. 9, at any time after processor 150 generates the basic table format, the manager can use terminal 110b to customize response table 200. Window features used to customize response table 200 are illustrated in FIG. 10.

Figure 10:
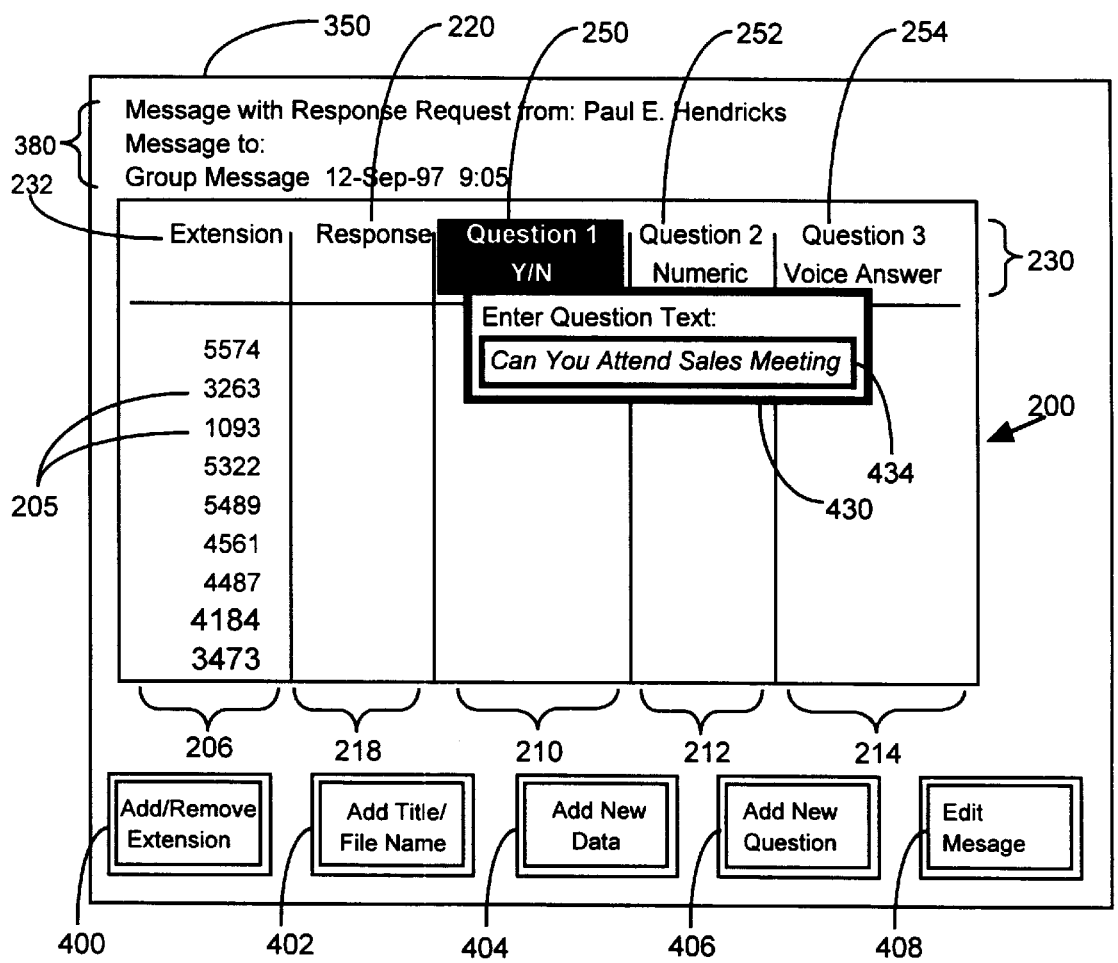
FIG. 10 is a computer display allowing the user to modify messages sent and to reformat the response table.

Referring to FIG. 10, a screen 350 used to customize or modify response table 200 is illustrated. Screen 350 includes a message identifier block 380, response table 200 and a plurality of "on-screen" buttons 400, 402, 404, 406 and 408 for modifying response table 200. Block 380 identifies the message initiator (e.g. "Paul E. Hendricks"), which questionnaire is presented in response table 200 and the date and time of the questionnaire.

One way to modify response table 200 is to provide relatively more descriptive headers. To this end, keyboard 178*b* can be used to move a cursor over header 250. By pressing a selection button a secondary window 430 is opened. To help the manager generate a suitable header, the recorded question corresponding to header 250 can be replayed via speaker 194 when the activation button is pressed. Window 430 includes a text box 434 for entering a more descriptive header. The manager can select text box 434 for a new header by designating the box via the cursor. A new header is entered via keyboard 178*b*. This process of providing more descriptive header entries can be used to provide more descriptive header entries for other header elements in header row 230. Referring to FIG. 11, new header entries 436, 438 and 446 have been provided for question columns 210, 212, and 214.

Referring again to FIG. 10, each of buttons 400, 402, 404, 406 and 408, can be selected using the cursor guided by keyboard 178*b*. Button 400 can be used to add or remove a recipient from the user subset and response table 200. To this end, to modify the user subset, the manager selects button 400 via the cursor. Although not illustrated, when button 400 is selected, processor 150 provides a second window with two options which are selectable via the cursor, one to add a user to, and one to remove a user from, the subset.

If the ADD option is selected, another window is provided wherein a text box allows the manager to enter another extension designating the user to be added to the user subset. When a user is added to the subset, the user identifier (i.e. extension name) is added to the subset and processor 150 adds another user element to user column 206 and adds another user row corresponding to the new user element. In addition, processor 150 places the questionnaire in the mail box owned by the added user. When responses are returned from the added user, processor 150 maps the responses to the appropriate response elements.

If the DELETE option is selected, another window is provided wherein a text box allows the manager to enter one of the extensions in user column 206 which is to be removed from the user subset. Processor 150 then removes the user element corresponding to the extension to be removed from response table 200, removes the corresponding user row and, if the questionnaire is still in the mail box of the user removed, removes the questionnaire from the user's mail box.

Button 402 allows a user to modify entry 324 so that the block is more descriptive. To modify entry 324, the manager uses the cursor to select button 402. Although not illustrated, when button 402 is selected, processor 150 provides a second window including a text box wherein the manager can enter new, usually more descriptive text. The new text is stored in memory 154 and replaces entry 324 thereafter each time the table is recalled for display.

Button 404 is used to add additional information in the form of an additional column to screen 350. To add additional data, the manager uses the cursor to select button 404. Although not illustrated, when button 404 is selected, processor 150 provides a second window including the instruction "Select Additional Information Using The Cursor" and a list of different types of additional data stored in memory 154 which can be provided in response table 200. Typically the additional data types will be types of data which are correlated with the user identifiers (i.e. the extensions) in the user elements. For example, the additional information may include sales regions, the previous years forecast, the previous years best sales representatives for each region and so on. Moving the cursor the manager selects one of the types of additional data. Additional information can be located in memory 154 or in other computer databases attached to computer network 180 or accessible using network 104.

After the additional type of data to be included has been selected, processor 150 presents another window including the instruction "Enter A New Header" and a text box for entering a new header. The manager enters a header in the text box which is descriptive of the additional data to be included in the table.

Next, processor 150 presents another window including the instruction "Use The Cursor To Select Point For New Column Insert". The manager moves the cursor to the boundary between columns where the new column is to be added. If the new column is to be the left most column in response table 200, the manager selects the left most boundary of response table 200.

Once the boundary is selected, processor 150 shifts columns right of the selected boundary to the right one column creating the additional column to accommodate the additional data which was selected. Then, processor 150 creates an additional header element in header row 230 above the new column to accommodate the new header entry, maps the additional information to the additional column and maps the responses to response elements, responses to questions to the right of the additional column shifted to the right by a single column.

Referring again to FIG. 11, the above described process of selecting additional information for a table, creating an additional header, inserting an additional column to accommodate the additional information and mapping was used to form columns 470 and 474 including header elements 476 and 478, respectively. Column 470 includes header entry "Sales Area" and the additional information includes regional entries corresponding to representatives in adjacent user elements in user column 206. Column 474 includes header entry "Current Year Forecast" and the additional data includes current year forecast entries.

Button 406 allows a manager to add additional questions to the questionnaire. To add additional questions, the manager uses the cursor to select button 406. Although not illustrated, when button 406 is selected, processor 150 provides a second window including the instruction "Annunciate additional question into microphone and then press '*' key". The manager uses microphone 190 to verbally enter the additional question and then presses the "*" key on keyboard 178*b*. Next, processor 150 provides a window including the instruction "Enter a 1 to require a YES/NO answer, a 2 to require a numeric answer and a 3 to require a verbal answer". The manager selects 1, 2, or 3.

As the question is annunciated into microphone 190, processor 150 records the question. After the "*" key and the type identifier (i.e. 1, 2 or 3 to identify response type required) are entered, processor 150 adds the additional question to the questionnaire and delivers the modified questionnaire to the designated user subset mail boxes, replacing the original questionnaire. In addition, processor 150 modifies response table 200 by adding an additional question column including a response element in each user row. When responses are received and the table is selected for display, processor 150 maps responses to the new question to the added question column.

Button 408 allows a manager to edit a question in a questionnaire. To edit a question, the manager uses the cursor to select button 408. Although not illustrated, when button 408 is selected, processor 150 provides a second window including the instruction "Which question would you like to edit?" and then provides a list of questions. In the present example, as there are three questions the list would include the entries "Question 1", "Question 2", and "Question 3". The manager uses the keyboard 178b and cursor to select the question to be edited. The manager presses the selection button. Next, processor 150 provides another window including the instruction "Annunciate modified question into microphone and then press "*" key." The manager uses microphone 190 to verbally enter the modified question and then presses the "*" key on keyboard 178b. Next, processor 150 provides a window including instruction "Enter a 1 to require a "YES/NO" answer, a 2 to require a numeric answer and a 3 to require a verbal answer". The manager selects 1, 2 or 3.

As a question is annunciated into microphone 190, processor 150 records the question, adds the additional question to the questionnaire, delivers the modified questionnaire to the designated user subset mailboxes, replacing the original questionnaire. Because one of the original questions was simply modified, processor 150 does not modify response table 200 at this point, however, when responses are received, depending on the type of responses, response table 200 may be altered accordingly during mapping.

D. E-Mail System

In addition to being used with a telephone system, the present invention is also advantageously applicable with an E-mail system. To this end, a terminal (e.g. personal computer, network computer, thin client, etc.) instead of a telephone can be used to designate a subset of system users and to formulate a questionnaire for delivery to E-mail boxes owned by the subset. The main difference between the invention used with voice mail and the invention used with E-mail is that the questionnaire and answers thereto are entered in different ways due to appliance hardware differences. In the voice mail system, questionnaires and answers are entered using the phone keypad 120 or verbally. In the E-mail system, questionnaires and answers are entered using a terminal keyboard (e.g. 178b).

With an E-mail system, as the questionnaire is formed, processor 150 again assembles response table 200 in the manner described above. Thus, the table includes a separate user element for each designated subset user, a user row for each user element and a question column for each specified question.

Referring to FIG. 12, an E-mail questionnaire 520 which might be entered by the manager in the example above is illustrated. Each question is entered and is followed by a simple indicator 530, 534 or 538 identifying the type of response required. Indicator 530 {Y N} indicates a YES/NO answer is required. Indicator 534 {#} indicates a numeric response is required. Indicator 538 {A–Z} indicates a textual response is requested.

Referring to FIG. 13, once the questionnaire has been formed, processor 150 forms questionnaire 550 which includes a questionnaire identifier block 560, standard instructions 564, questions and response type indicators 530, 534 and 538. Questionnaire identifier block 560 identifies the initiator, recipient and the subject of the questionnaire. Instructions 564 instruct the recipient how to answer the questions and provide a key for understanding response type indicators 530, 534 and 538.

An E-mail program may be used by the initiator and recipients which automatically format the E-mail questionnaire 520 to insert text and graphic buttons instead of the bracketed phrases with specific questions and response formats. This is available with E-mail programs that allow hypertext markup language (html) formats that can specify data entry fields within the text of the E-mail record.

After questionnaire 550 is formed, processor 150 sends the questionnaire 550 to the E-mail boxes corresponding to subset users. When the users access the questionnaire, processor 150 presents the questions, one at a time, and receives responses thereto. The responses and a user identifier are assembled to form a message packet which is stored in memory 154.

When the questionnaire initiator elects to display the table, processor 150 displays the table and maps responses to the table as described above.

The sales manager can retrieve returned messages using terminal 110b for presentation on display 174b. The manager can user processor 150 to modify an E-mail table in the manner described above with respect to a voice mail based table.

Referring to FIG. 14, an E-mail based table 570 which is essentially identical to modified response table 200 in FIG. 11 is illustrated. Entries in table 570 are the same as entries in the response table 200 except for entries in column 214 which corresponds to the third question. Because E-mail is not typically verbal, textual responses are provided in column 214. In addition, table 570 does not include column 474.

It should be understood that the methods and apparatuses described above are only exemplary and do not limit the scope of the invention, and that various modifications could be made by those skilled in the art that would fall under the scope of the invention. For example, while the invention is described as one wherein, when a telephone is used to enter questionnaires and responses, keypad 120 is used to enter certain types of information (e.g. a "*" to indicate the end of a question or answer, a "1" or a "0" to indicate YES and NO, etc.), the invention is also meant to cover systems wherein all information can be entered verbally and processor 150 includes voice recognition software which receives verbal responses and changes those responses into symbols for display in table form.

In addition, while the E-mail version of the invention is described as one wherein information is entered using keyboard 178b, clearly, where processor 150 (or processor 170b for that matter) includes voice recognition software, information, including questionnaires and responses, could be entered verbally and converted to text for display.

Moreover, once the invention creates an initial table and specifies mapping, other types of spreadsheet software could be used to modify the table and further process the table, such as the automatic summation of the entries in column 212 to create total 580, FIG. 11. Furthermore, while it is taught that processor 150 maps responses and additional information into response table 200 only after a user elects to view the table, clearly mapping could take place prior to such an election, after message packets have been completed. Also, while response table 200 including columns and rows is preferred, the invention is meant to cover other display formats, such as including charts and graphs. The important aspect being that display format is automatically generated as questions are entered and mapping into the format is automatic.

Furthermore, after questions have been entered by a system user creating a questionnaire, the system may allow for a comment period wherein the questionnaire initiator provides comments or other "one way" informational messages. Similarly, comment periods may be providable either before a questionnaire or between questions.

To apprise the public of the scope of this invention, I make the following claims:

I claim:

1. A method to be used with a voice messaging system including a processor, a visual display and a plurality of electronic voice mail boxes, one box for each of a plurality of system users, the system enabling at least one user to provide questions in the boxes of each of at least a subset of system users, a user providing a question being an initiator, the system allowing each subset user to listen and respond to the questions using a telephone, the system receiving the questions and subsequently receiving responses, the method for generating a format for viewing a user subset and received responses on the visual display, the method comprising the steps of:

(a) receiving at least one question from the initiator for delivery to the subset of system users;
   (b) arranging a display format including response elements for displaying the subset and responses to the at least one question on the visual display, the format dependent on the subset and received questions; and
   (c) mapping responses to specific questions from specific users to corresponding response elements for display.

2. The method of claim 1 further including the step of receiving an indicator identifying the user subset from the initiator.

3. The method of claim 2 wherein the format is a response table including columns and rows, each column including a plurality of column elements, each row including one column element from each column, the method further including the steps of, forming a user column including a separate user element for each subset user, each user element corresponding to a separate user row and forming a separate question column for each received question, each question column including a column for each received question, each question column including a separate response element corresponding to each user row and, wherein the step of mapping includes mapping the responses to corresponding question columns and user rows.

4. The method of claim 3 further including the step of providing the indicator and questions using a telephone.

5. The method of claim 3 further including the step of providing the indicator and questions using a computer.

6. The method of claim 3 wherein the step of receiving an indicator includes the steps of, receiving a plurality of indicators, each indicator identifying one system user, all identified users forming the user subset.

7. The method of claim 3 further including the step of forming a heading row including a header element for each question column.

8. The method of claim 3 wherein the system also includes a memory having additional information which can be correlated with each subset user and the method further includes the steps of accessing the additional information, forming an additional column for displaying the additional information and mapping the additional information to the additional column.

9. The method of claim 8 wherein the additional information is a user name.

10. The method of claim 3 wherein the system also includes a memory, a user can provide an end session signal to indicate that a last question has been entered and the step of receiving at least one question includes the step of receiving a user entry, determining if the entry is an end session signal, and, where the entry is not an end session signal, executing the forming a user column, forming a separate question column and mapping steps and, where the entry is an end session signal, storing the table.

11. The method of claim 3 also for displaying the table and further including the step of displaying the table on the visual display.

12. The method of claim 11 wherein the system also includes an interface, a speaker and a memory linked to the visual display and the method further includes the steps of storing each question received in the memory, forming a header row including a header element for each question stored, determining when a user selects a header element via the interface and, when a header element is selected, audibly articulating the stored question which corresponds to the header element selected.

13. The method of claim 11 wherein the system also includes an interface linked to the visual display and the method is also for modifying the table that appears on the visual display, the method further including the steps of, providing modification commands via the interface and modifying the table accordingly.

14. The method of claim 13 wherein the step of providing modification commands includes the step of identifying which question columns correspond to provided questions and the step of modifying includes the step of mapping the responses to corresponding identified question columns and user rows.

15. The method of claim 13 wherein the system also includes a memory including additional information of at least one type associated with each subset user and the step of providing modification commands also includes the steps of identifying additional information types to be displayed and identifying a specific table column for displaying each additional information type identified and the step of modifying includes the step of shifting the question columns to accommodate the additional information columns, mapping the additional information to the additional information columns and remapping the responses to the shifted question columns.

16. The method of claim 13 wherein the step of providing modifying commands includes the step of receiving an additional user for the user subset and the step of modifying includes the step of adding a user row including a user element in the user column and separate response elements in each of the question columns corresponding to the additional user.

17. The method of claim 13 wherein the method also includes the step of forming a heading row in the table including a heading element for each question column and the step of providing modifying commands includes the step of receiving a heading title for at least one heading element and the step of modifying includes the step of providing each heading title in the corresponding heading element.

18. The method of claim 13 wherein the step of providing modifying commands includes the steps of indicating an additional question and providing an additional question and the step of modifying includes the step of providing an additional question column for the additional question and mapping responses to the additional question to the additional column.

19. The method of claim 11 wherein the system also includes a memory linked to the visual display and responses can be digital tones, digital codes, and voice responses and the method further includes the steps of, determining the type of response where the response is voice, storing the voice responses in the memory and providing a voice indicator symbol in a response element in the question column and user row corresponding to an associated question and user, respectively, and, where the response is digital, displaying the response in the corresponding response element.

20. The method of claim 19 wherein the system also includes a speaker and an interface linked to the display and the method further includes the steps of, determining when a user selects a voice indicator symbol via the interface and, when a voice indicator symbol is selected, audibly articulating the stored voice response which corresponds to the selected voice indicator symbol.

21. The method of claim 11 wherein, when no response has been received which corresponds to a specific response element, the method includes the step of providing an indicator that no response has been received.

22. The method of claim 1 further including the step of receiving a response to at least one question.

23. A method to be used with an automatic voice messaging system which includes a memory, a processor, a visual display and a plurality of voice mail boxes, one box for each of a plurality of system users, the system enabling at least one user to provide a plurality of questions in the boxes of each of at least a designated system user subset, the system allowing each subset user to listen to and respond to the questions using a telephone, the system receiving and formatting the response data from each user into a user message packet, the method for visually presenting responses in a table format via the visual display, the table format stored in the memory and including columns and rows, each column including a plurality of column elements, each row including one column element from each column, each of at least a subset of columns being question columns, a separate question column corresponding to each of the questions and including a response element corresponding to a separate subset user, the method comprising the steps of:

receiving the packets;

separating each packet into responses, a separate response corresponding to each of the questions;

identifying the table format;

mapping each response to a response element corresponding to a subset user and a corresponding question column; and displaying the responses on the display in the table format.

24. The method of claim 23 wherein the table format also includes a user column including a user element corresponding to each subset user and user rows, each user row including a user element and a response element in each of the question columns, the step of separating also includes the step of identifying the subset user corresponding to the message packet and generating a user identifier for the packet, the step of mapping includes, for each message packet, mapping the identifier to a user element and mapping responses to corresponding response elements in the user row associated with the response element.

25. The method of claim 23 wherein additional information is stored in the memory which can be correlated with various responses and wherein the method further includes the steps of, after separating the packets into separate responses, correlating at least one of the responses with a subset of the additional information and providing the information subset as the response for displaying.

26. The method of claim 25 wherein the at least one response is a user identification code and the information subset is a name of a user.

27. The method of claim 25 wherein the at least one response is a number and the information subset is a job title.

28. The method of claim 23 wherein the responses can be digital tones, digital codes, and voice responses and the method further includes the steps of, after separating each packet into responses, determining the type of responses, where the responses are voice, storing the voice responses in the memory and providing a voice indicator symbol for display in a corresponding response element and where the responses are digital, displaying the response in the corresponding response element.

29. The method of claim 23 wherein the visual display is a computer screen and the step of displaying includes the step of presenting the responses on the screen in the table format.

30. The method of claim 23 further including the steps of, prior to displaying, determining which of the designated system user subset has not responded to the plurality of questions and providing responses corresponding to each of the non-responding users for display indicating that no response has been received.

31. The method of claim 23 further including the steps of, prior to displaying, when a user has responded to at least one of the questions but not all of the questions, determining which of the questions have not been responded to and providing a response for each of the questions which have not been responded to indicating that no response was received.

32. An apparatus to be used with a voice messaging system including a processor, a visual display and a plurality of electronic voice mail boxes, one box for each of a plurality of system users, the system enabling at least one user to provide questions in the boxes of each of at least a subset of system users, a user providing a question being an initiator, the system allowing each subset user to listen and respond to the questions using a telephone, the system receiving the questions and subsequently receiving responses, the apparatus for generating a format for viewing the user subset and received responses on the visual display, the apparatus comprising:

(a) means for receiving at least one question from the initiator for delivery to the subset of system users;

(b) means for arranging a display format including response elements for displaying the subset and responses to at least one question, the format dependent on the subset and received questions; and (c) means for mapping responses to specific questions from specific users to corresponding response elements for display.

33. The apparatus of claim 32 further including a means for receiving an indicator identifying the user subset from the initiator.

34. The apparatus of claim 33 wherein the format is a response table including columns and rows, each column including a plurality of column elements, each row including one column element for each column, the apparatus further including means for forming a user column including a separate user element for each subset user, each user element corresponding to a separate user row and means for forming a separate question column for each received question, each question column including a separate response element corresponding to each user row and, wherein, the means for mapping includes means for mapping the responses to corresponding question columns and user rows.

35. The apparatus of claim 34 further including means for providing the indicator and questions using a telephone.

36. The apparatus of claim 34 further including means for providing the indicator and questions using a computer.

37. The apparatus of claim 34 wherein the means for receiving an indicator includes means for receiving a plurality of indicators, each indicator identifying one system user, all identified users forming the user subset.

38. The apparatus of claim 34 further including means for forming a heading row including a heading element for each question column.

39. The apparatus of claim 34 wherein the system also includes a memory having additional information which can be correlated with each subset user and the apparatus further includes means for accessing the additional information, means for forming an additional column for displaying the additional information and means for mapping the additional information to the additional column.

40. The apparatus of claim 39 wherein the additional information is a user name.

41. The apparatus of claim 34 wherein the system also includes a memory, a user can provide an end session signal to indicate that a last question has been entered and the means for receiving at least one question includes means for receiving a user entry, means for determining if the entry is an end session signal, and, wherein, where the entry is not an end session signal, the means for forming a separate user column and means for forming a separate question column form the respective columns and the means for mapping maps and, where the entry is an end session signal, the means for receiving at least one question further includes means for storing the table.

42. The apparatus of claim 34 also for displaying the table and further including means for displaying the table on the visual display.

43. The apparatus of claim 42 wherein the system also includes an interface, a speaker and a memory linked to the visual display and the apparatus further includes means for storing each question received in the memory, means for forming a heading row including a heading element for each question stored, means for determining when a user selects a heading element via the interface and, when a heading element is selected, means for audibly articulating the stored question which corresponds to the heading element.

44. The apparatus of claim 42 wherein the system also includes an interface linked to the visual display and the apparatus is also for modifying the table that appears on the visual display, the apparatus further including means for providing modification commands via the interface and means for modifying the table accordingly.

45. The apparatus of claim 44 wherein the means for providing modification commands includes means for identifying which question columns correspond to provided questions and the means for modifying includes means for mapping the responses to corresponding identified question columns and user rows.

46. The apparatus of claim 44 wherein the system also includes a memory including additional information of at least one type associated with each subset user and the means for providing modification commands also includes means for identifying additional information types to be displayed and identifying a specific table column for displaying each additional information type identified and the means for modifying includes means for shifting the question columns to accommodate the additional information columns, means for mapping the additional information to the additional information columns and means for remapping the responses to the shifted question columns.

47. The apparatus of claim 44 wherein the means for providing modifying commands includes means for receiving an additional user for the user subset and the means for modifying includes means for adding a user row including a user element in the user column and separate response elements in each of the question columns corresponding to the additional user.

48. The apparatus of claim 44 wherein the apparatus also includes means for forming a heading row in the table including a heading element for each question column and the means for providing modifying commands includes means for receiving a heading title for at least one heading element and the means for modifying includes means for providing each heading title in the corresponding heading element.

49. The apparatus of claim 44 wherein the means for providing modifying commands includes means for indicating an additional question and providing an additional question and the means for modifying includes means for providing an additional question column for the additional question and means for mapping responses to the additional question to the additional column.

50. The apparatus of claim 44 wherein the system also includes a memory linked to the visual display and responses can be digital tones, digital codes, and voice responses and the apparatus further includes means for determining the type of response is, where the response is voice, means for storing the voice responses in the memory and means for providing a voice indicator symbol in a response element in the question column and user row corresponding to an associated question and user, respectively, and, where the response is digital, means for displaying the response in the corresponding response element.

51. The apparatus of claim 50 wherein the system also includes a speaker and an interface linked to the display and the apparatus further includes means for determining when a user selects a voice indicator symbol via the interface and, when a voice indicator symbol is selected, means for audibly articulating the stored voice response which corresponds to the selected voice indicator symbol.

52. The apparatus of claim 51 wherein, when no response has been received which corresponds to a specific response element, the apparatus includes the means for providing an indicator that no response has been received.

53. An apparatus to be used with an automatic voice messaging system which includes a memory, a data lead, a processor, a visual display and a plurality of electronic voice mail boxes, one box for each of a plurality of system users, the system enabling at least one user to provide a plurality of questions in the boxes of each of at least a system user subset, the system allowing each subset user to listen to and respond to the questions using a telephone, the system receiving and formatting the response data from each user into a user message packet, the apparatus for visually presenting the responses in a table format via the visual display, the table format stored in the memory and including columns and rows, each column including a plurality of column elements, each row including one column element from each column, each of at least a subset of columns being question columns, a separate question column corresponding to each of the questions and including a response element corresponding to a separate subset user, the apparatus comprising:

means for receiving the packets;

means for separating each packet into responses, a separate response corresponding to each of the questions;

means for identifying the table format;

means for mapping each response to a response element corresponding to a subset user and a corresponding question column; and means for displaying the responses on the display in the table format.

54. The apparatus of claim 53 wherein the table format also includes a user column including a user element corresponding to each subset user and user rows, each user row including a user element and a response element in each of the question columns, the means for separating also includes means for identifying the subset user corresponding to the message packet and means for generating a user identifier for the packet, the means for mapping includes, for each message packet, means for mapping the identifier to a user element and means for mapping responses to corresponding response elements in a user row associated with the response element.

55. The apparatus of claim 53 wherein additional information is stored in the memory which can be correlated with various responses and wherein the apparatus further includes means for, after separating the packets into separate responses, correlating at least one of the responses with a subset of the additional information and providing the information subset as the response for displaying.

56. The apparatus of claim 55 wherein the at least one response is a user identification code and the information subset is a name of a user.

57. The apparatus of claim 55 wherein the at least one response is a number and the information subset is a sales region.

58. The apparatus of claim 53 wherein the responses can be digital tones, digital codes, and voice responses and the apparatus further includes means for, after separating each packet into responses, determining the type of responses are digital or voice, where the responses are voice, means for storing the voice responses in the memory and means for providing a voice indicator symbol for display in a corresponding response element and where the responses are digital, displaying the response in the corresponding response element.

59. The apparatus of claim 53 wherein the visual display is a computer screen and the means for displaying includes means for presenting the responses on the screen in the table format.

60. The apparatus of claim 53 further including means for, prior to displaying, determining which of the designated system user subset has not responded to the plurality of questions and means for providing responses corresponding to each of the non-responding users for display indicating that no response has been received.

61. The apparatus of claim 53 further including means for, prior to displaying, when a user has responded to at least one of the questions but not all of the questions, determining which of the questions have not been responded to and means for providing a response for each of the questions which have not been responded to indicating that no response was received.

* * * * *